Patented Mar. 15, 1949

2,464,250

UNITED STATES PATENT OFFICE 2,464,250

POLYMERIC VINYLIDENE CHLORIDE COMPOSITIONS CONTAINING A LIGHT STABILIZER

Harold W. Moll and Edgar C. Britton, Midland, Mich., assignors to The Dow Chemical Company, Midland, Mich., a corporation of Delaware No Drawing. Application April 10, 1942, Serial No. 438,438

5 Claims. (Cl. 260—92.5)

This invention relates to compositions of matter comprising polymeric vinylidene chloride products and certain light stabilizers therefor.

As herein used, the term "polymeric vinylidene chloride product" includes the polymer of vinylidene chloride alone and other products, whether polymers, copolymer, interpolymers, or otherwise named, which may be obtained by polymerizing together monomeric vinylidene chloride and one or more of the monomers of other polymerizable materials, such as vinyl chloride, vinyl acetate, vinyl ethers, ethyl acrylate, methyl methacrylate, acrylic nitrile, butadiene, styrene, allyl chloride, and the allyl, methallyl, crotonyl, 2-chloroallyl, or cinnamyl esters of mono and dicarboxylic acids. The polymer of vinylidene chloride alone is described in U. S. Patent No. 2,160,903 and many of its copolymers with other polymerizable compounds as well as certain plasticized compositions comprising these copolymers, and ways in which the products may be made are described in U. S. Patents 2,160,904; 2,160,931–943; 2,160,945–948; 2,235,782, and 2,238,020.

These products are capable of being molded to form useful articles under the combined effect of heat and pressure. Some of them exhibit sufficient solubility in certain solvents, particularly at elevated temperatures to permit their being cast as films. It has been observed that articles produced from polymeric vinylidene chloride products, either by molding, extrusion, or by casting from solution tend to become brittle and discolored or otherwise deteriorated when exposed for long periods of time to the effect of light. This appears to be particularly true of articles having a thin cross section, especially when they are subjected to the effects of ultraviolet light. This apparent shortcoming of articles produced from polymeric vinylidene chloride products makes it highly desirable to obtain stabilizers for these products which will prevent or at least minimize the darkening effect heretofore observed when the products have been exposed to light. While various expedients have been proposed to overcome this effect no completely satisfactory means of providing adequate stabilization against such deterioration has been available.

It is accordingly among the objects of the present invention to provide a polymeric vinylidene chloride product stabilized against the darkening and embrittling effects of light. Another object is to provide a composition comprising a polymeric vinylidene chloride product and a light stabilizer therefor.

In general, the invention comprises the incorporation of small but effective amounts of light stabilizing agents with the polymeric vinylidene chloride products so as to render the polymeric products substantially unaffected by the light. While varying amounts of the stabilizing agents may be used, we have found that from about 0.5 to about 10 per cent of the compounds, based on the weight of the polymeric vinylidene chloride product used, are particularly effective. We have added as much as 25 per cent of the stabilizing agents to the polymeric vinylidene chloride products but it has been found that when the stabilizing agents are used in amounts of from about 0.5 to about 10 per cent, the other properties of the polymeric products are not materially altered and their value for the customary uses is not decreased.

The materials which we have found useful as light stabilizers for polymeric vinylidene chloride products are the aryl esters of hydroxy benzoic acids having the general formula:

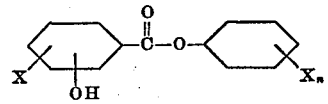

wherein one X is selected from the group consisting of halogen, hydrocarbon, and hydrocarbonoxy radicals, the other X is selected from the group consisting of hydrogen, halogen, hydrocarbon, and hydrocarbonoxy radicals, and $n$ is an integer not greater than 3. Specifically excluded from the compounds with which the invention is concerned are those containing such groups as —$NH_2$ or radicals embodying readily replaceable hydrogen, such as —OH, —COOH, and —$SO_3H$. The classification "hydrocarbon" includes alkyl, aryl, aralkyl, cycloalkyl, etc. Included within the scope of "halogen" are chlorine, bromine, and iodine.

Representative members of the above described class of compounds have been tested and found useful as light stabilizing agents for polymeric vinylidene chloride products. In addition to a light stabilizing effect, the ester compounds exert some plasticizing and heat stabilizing action on the compositions in which they are employed. Representative of the esters with which the present invention is concerned are 5-tert.-butyl-2-xenyl salicylate, 4-tert.-amylphenyl salicylate, 4-tert.-butylphenyl 5-tert.-amylsalicylate, 2-cyclohexylphenyl 5-tert.-hexylsalicylate, 2-methoxyphenyl 5-tert.-butyl-salicylate, 4-benzylphenyl salicylate, 3,5-dibromo-2-xenyl salicylate, 4-cyclohexylphenyl 2-chloro-salicylate, 2-xenyl 5-tert.-butylsalicylate, 4-tert.-butylphenyl 4-hydroxybenzoate, 4-chlorophenyl 4-hydroxybenzoate, 4-cyclohexylphenyl 4-hydroxybenzoate, 3,5-dimethylphenyl 3-hydroxybenzoate, 4-iodophenyl salicylate, orthocresyl 4-bromosalicylate, 4-tert.-butoxyphenyl 5-methylsalicylate, 2-benzyloxyphenyl 5-tert.-octylsalicylate, 4-phenoxyphenyl salicylate, 2.4.6-trichlorophenyl 5-phenylsalicylate, phenyl 5-benzylsalicylate, phenyl 3-cyclohexyl-4-hydroxybenzoate, phenyl 5-butoxysalicylate, phenyl 5-benzyloxysalicylate, 4-tert.-butylphenyl salicylate, 2-xenyl salicylate, 2-cyclohexylphenyl salicylate, thymyl salicylate, 4-chlorophenyl salicylate, 4-tert.-butylphenyl 5-tert.-butylsalicylate, 4-tert.-butylphenyl 2-chlorosalicylate, 3,5-diethylphenyl salicylate, 4-chlorophenyl 5-tert.-butylsalicylate, 4-tert.-octylphenyl 5-tert.-butylsalicylate, phenyl 5-tert.-butylsalicylate, etc. Mixtures of two or more of such compounds may also be employed in accordance with the present invention.

A preferred group of compounds are those having the formula:

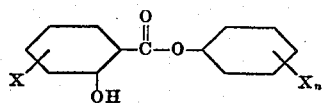

wherein X and $n$ are defined in the same manner as in the preceding formula.

The light stabilizing compounds may be incorporated with the polymeric vinylidene chloride product by any of several methods, e. g. grinding the materials in a ball mill, compounding them on hot rolls in a manner similar to compounding rubber compositions, etc. A preferred method of incorporating the stabilizing compounds with the polymeric vinylidene chloride product comprises the steps of dissolving the stabilizing compound in a small amount of a readily volatile solvent, mixing or grinding the solution with the vinylidene chloride product in a ball mill or other suitable apparatus until thoroughly blended, and thereafter evaporating out the solvent. When the polymeric vinylidene chloride product is capable of being dissolved or otherwise dispersed in an organic solvent, the stabilizer may be added to the solution and the stabilized polymeric product thereafter separated from the solution.

Regardless of the means whereby the stabilizers are incorporated with the polymeric products, a marked stabilizing effect is obtained when the mixture is exposed to light. Thus, a film or filament prepared from a polymeric vinylidene chloride product which does not contain a stabilizing agent may assume a dark brown or black coloration after several days exposure to sunlight. In contrast, analogous articles comprising small amounts of the stabilizing agents may be exposed to sunlight or ultraviolet light rays for long periods without becoming materially discolored.

The following examples illustrate the practice of the invention:

EXAMPLE 1

A polymeric vinylidene chloride product consisting of a copolymer of about 90 per cent vinylidene chloride and about 10 per cent vinyl chloride was modified with representative stabilizing esters in amounts of from about 0.5 to about 10 per cent by weight. The stabilizer was in each instance dissolved in a small amount of acetone and ground with the copolymer in a ball mill until thoroughly blended. The products were then dried to remove solvent. The resulting compositions were heated in the chamber of an extrusion press to 190° C., and shaped by extrusion under pressure through a die having an orifice 0.022 inch in diameter. Test specimens of the filaments obtained were exposed to ultraviolet rays for 100 hours in a standard fadeometer under controlled conditions of temperature and humidity. A temperature of 60° C. and relative humidity of 50 per cent were maintained throughout the exposure. In all determinations, observations were made on the test samples before, during, and after the exposure, the color change or darkening indicating the degree of deterioration resulting from the treatment.

The following table sets forth the results obtained with filaments comprising representative members of the herein described class of ester compounds, together with the amounts of such compounds employed.

Table

| Test No. | Light Stabilizing Compound | Per Cent | Color of Test Specimen | |
|---|---|---|---|---|
| | | | Before | After 100 hours |
| 0 | Blanks (6 samples) | | colorless | Dark brown to black. |
| 1 | 4-tert.-Butylphenyl Salicylate | 2 | do | Colorless. |
| 2 | Cyclohexylphenyl Salicylate | 10 | do | Do. |
| 3 | Thymyl Salicylate | 10 | do | Light brown. |
| 4 | 2-Xenyl Salicylate | 5 | do | Do. |
| 5 | 4-tert.-Butylphenyl 2-Chlorosalicylate | 10 | do | Colorless. |
| 6 | 4-tert.-Butylphenyl 5-tert.-Butylsalicylate | 10 | do | Do. |
| 7 | 4-Chlorophenyl Salicylate | 10 | do | Light brown. |
| 8 | 3,5-Diethylphenyl 5-tert.-Butylsalicylate | 10 | do | Do. |

Each of the stabilizing esters in the amounts employed improved the ability of the copolymeric vinylidene chloride product to withstand the effects of continued exposure to light. The filaments prepared from the unmodified composition started to darken after 3 to 4 hours exposure in the fadeometer and at the end of 100 hours varied in color from dark brown to black. Analogous results were observed when test filaments of both modified and unmodified copolymer product were exposed to weathering and sunlight in outdoor exposure tests over a period of 126 days.

EXAMPLE 2

2 parts by weight of 4-tert.-butylphenyl salicylate were incorporated with 20 parts of acetone. To this solution was added 98 parts by weight of a copolymer consisting of about 90 per cent vinylidene chloride and 10 per cent vinyl chloride. This mixture was ground until thoroughly blended and then dried. The resulting composition was well adapted to be molded and extruded. Filaments thereof having a diameter of 0.018 inch were clear and colorless and had a tensile strength above 44,000 pounds per square inch. Test samples of these filaments were exposed to ultraviolet light for 100 hours as described in Example 1 without any substantial change in color. By way of contrast, control filaments prepared from unmodified copolymer turned a dark brown color when exposed to light in a similar manner.

EXAMPLE 3

10 parts by weight of 4-tert.-butylphenyl salicylate was dissolved in 20 parts of acetone. 90 parts by weight of a copolymer consisting of 85 per cent vinylidene chloride and 15 per cent vinyl cyanide and plasticized with 10 per cent by weight of di-(alpha-phenylethyl) ether was added to the stabilizer solution. The mixture was ground until thoroughly blended, dried, and the residue molded under pressure at a temperature of 165° C. to form a sheet about 0.02 inch thick. Test specimens one-half inch wide and 3 inches long were cut from the molded sheet and exposed to light for 100 hours in a standard fadeometer without undergoing substantial color change. Test specimens prepared from the unstabilized copolymer turned dark brown in color under the conditions of the test.

EXAMPLE 4

In a similar manner 10 parts by weight of 4-tert.-butylphenyl salicylate was incorporated with 90 parts by weight of a copolymer consisting of 95 per cent vinylidene chloride and 5 per cent vinyl acetate. Test specimens prepared from the composition remained substantially colorless when exposed to light for 100 hours in a standard fadeometer. Control specimens prepared from the unmodified copolymer turned a brown color when exposed to light in the same manner.

The compositions of the present invention may be further modified with small amounts of plasticizers, fillers, heat stabilizers, coloring agents, and the like so long as such addition agents are not deleterious to the desirable properties of the polymeric products. Suitable plasticizers and heat stabilizing agents include aryloxy- and alkyloxy-substituted epoxy compounds such as 1,2 - epoxy - 3 -(2-xenoxy)-propane, 1,2-epoxy-3-butoxy-propane, and diaralkyl ethers such as di-(alpha-phenylethyl) ether.

The invention has been illustrated with particular reference to polymeric vinylidene chloride products consisting of vinylidene chloride and vinylidene chloride copolymerized with vinyl chloride, vinyl cyanide, and vinyl acetate in which the proportion of vinylidene chloride predominates. It is to be understood, however, that the invention is not limited in its application to copolymers of such proportion but is broadly concerned with vinylidene chloride compositions and copolymers with particular reference to those falling within the term, "polymeric vinylidene chloride product," as heretofore defined. In its broadest concept the present invention is limited only by the requirement that the "polymeric vinylidene chloride product" employed be one which normally is discolored or undergoes other deterioration when exposed to light.

We therefore particularly point out and distinctly claim as our invention:

1. A polymeric vinylidene chloride product comprising as a light stabilizing agent a compound having the formula:

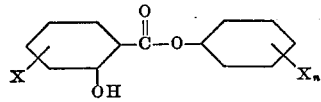

wherein one X is selected from the group consisting of halogen, hydrocarbon, and hydrocarbonoxy radicals, the other X is selected from the group consisting of hydrogen, halogen, hydrocarbon and hydrocarbonoxy radicals, and $n$ is an integer not greater than 3.

2. A polymeric vinylidene chloride product comprising from about 0.5% to about 10% of a compound having the formula:

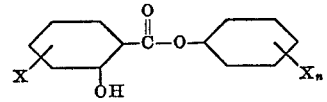

wherein one X is selected from the group consisting of halogen, hydrocarbon, and hydrocarbonoxy radicals, the other X is selected from the group consisting of hydrogen, halogen, hydrocarbon and hydrocarbonoxy radicals, and $n$ is an integer not greater than 3.

3. A polymeric vinylidene chloride product containing from about 0.5% to about 10% by weight of 4-tert.-butyl-phenyl salicylate.

4. A polymeric vinylidene chloride product containing from about 0.5% to about 10% by weight of 4-tert.-butyl-phenyl 5-tert.-butylsalicylate.

5. A polymeric vinylidene chloride product containing from about 0.5% to about 10% by weight of 4-tert.-butyl-phenyl-2-chloro salicylate.

EDGAR C. BRITTON.
HAROLD W. MOLL.

REFERENCES CITED

The following references are of record in the file of this patent:

UNITED STATES PATENTS

| Number | Name | Date |
|---|---|---|
| 2,232,933 | Wiley | Feb. 25, 1941 |

FOREIGN PATENTS

| Number | Country | Date |
|---|---|---|
| 492,558 | Great Britain | Sept. 22, 1938 |